Dec. 27, 1938.   R. G. FOSTER   2,141,526
EDUCATIONAL APPARATUS
Filed April 25, 1936
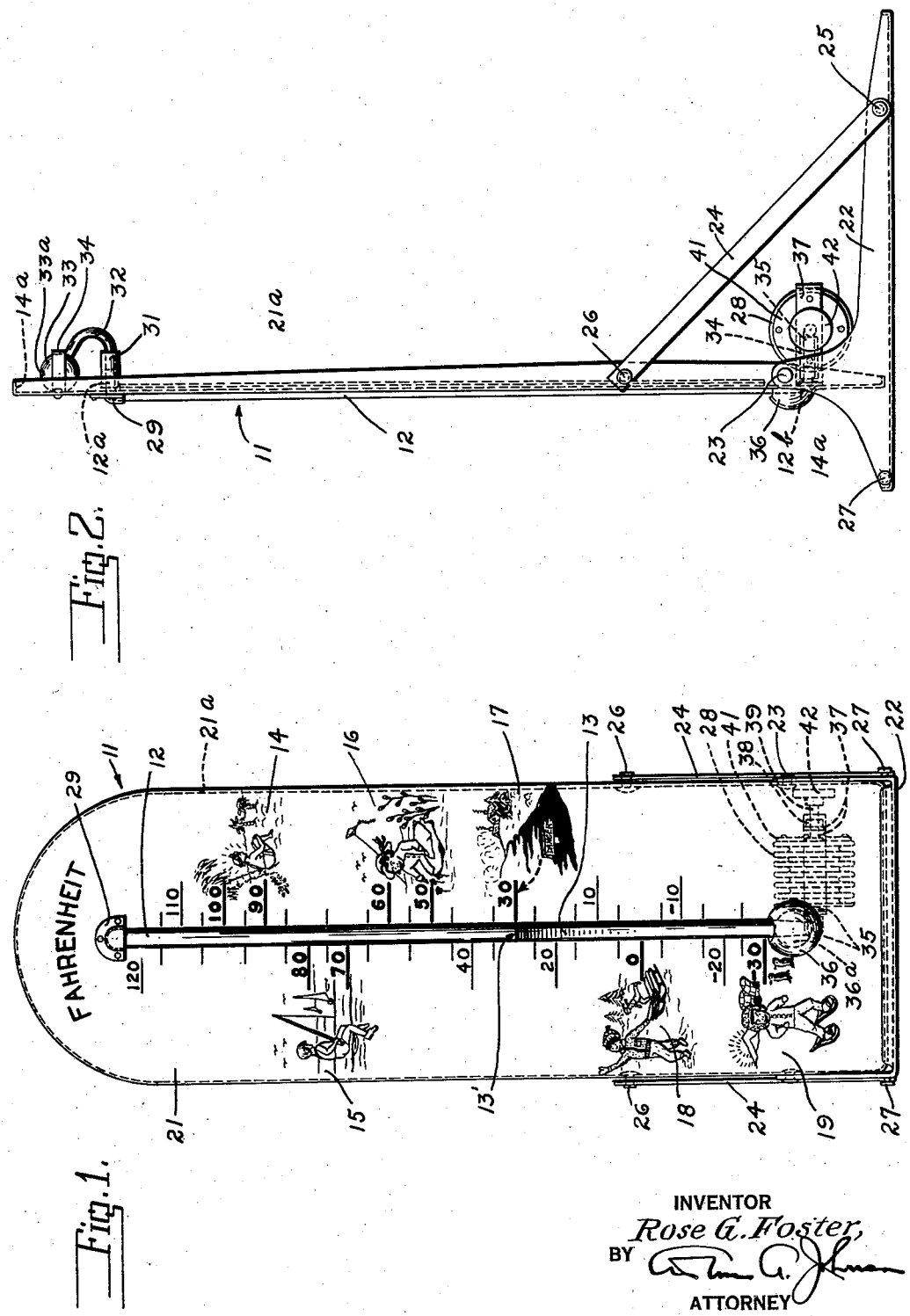
INVENTOR
Rose G. Foster,
BY 
ATTORNEY Patented Dec. 27, 1938

2,141,526

UNITED STATES PATENT OFFICE 2,141,526

EDUCATIONAL APPARATUS

Rose G. Foster, Norwalk, Conn.

Application April 25, 1936, Serial No. 76,333

2 Claims. (Cl. 35—39)

This invention relates to educational apparatus, and one of the objects thereof is to provide a novel and valuable apparatus for teaching a child to read a thermometer.

Another object is to provide such an apparatus, and one whereby a child of tender years, but who has been instructed in arithmetic at least to the extent of being able to read and recognize numerals representing tens and hundreds as well as units values, can be given repetitive practice in the reading of such numerals while being instructed in the reading of a thermometer and being educated as to the meanings, and particularly the health and safety affecting significance, of the temperature readings thereof.

Still another object is to provide such apparatus, and one whereby a child can be educated in the reading of a thermometer, and can be at the same time instructed, by significantly grouped or otherwise cross-related replicas of actual thermometer readings and especially graphic representations, as to the proper health-guarding attire for outdoor wear, and/or as to the special precautions to be taken toward safe-guarding limb or life as well as health, at certain temperature readings, whether these last be in degrees or in range of degrees.

The invention will be more clearly understood, and the various objects and advantages thereof appreciated, from the following description of the present preferred embodiment of practicable apparatus as shown in the accompanying drawing.

In the drawing:

Figure 1, showing one of said embodiments, is a front elevation of an apparatus according to the invention and by the use of which the purpose of the invention may be carried out.

Fig. 2 is a side elevation of the apparatus shown in Figure 1.

Referring now in detail to the drawing, the apparatus shown comprises a wall structure 11, the front face of which is adapted to present to the child's eye a conventional picturization of a standard thermometer, say one calibrated according to the Fahrenheit scale, as indicated by the legend thereon.

This picturization includes a representation of a column of liquid which in an actual thermometer varies its visable level according to actual temperature variations in the vicinity of the thermometer. In the present case, the representation last referred to is an actual column of liquid in a vertical glass tube 12; such liquid, conveniently water colored red with an aniline dye, being shown at 13, and as having been brought to a desired level 13' in the tube, by manually controllable means hereinafter to be described.

Thus said level 13', as in an actual thermometer, constitutes an index means for a particular temperature reading. But this index is not intended primarily to be coactant with or indicative of a temperature reading corresponding to an actual temperature then prevailing. On the contrary, as will be understood, it is to be varied at will to become coactant with or indicative of any selected temperature reading to be designated, emphasized or discussed. In further simulation of a thermometer, the picturization carried by the front face of the wall 11 is desirably inclusive of a full set of calibrations as on an ordinary thermometer. For simplicity of disclosure, only the main or tens elements of such readings are shown in Figure 1, to wit, the numerals —30, —20, —10, 0, 30, 40, 50, 60 and so on up to 120. In the present case, these calibrations are shown as partly carried on one side of the tube 13 and partly on the other side thereof.

Wall 11 also carries on its front face a plurality of representations each graphically picturizing an outdoor environment appropriate to a particular calibration or range of calibrations. For convenience, and indicative of a present preference, some of these are shown on one side of the tube 13, and some on the other side thereof. It is desirable that these depictions be so placed as to be separately as prominent as possible and with each significantly placed adjacent to a certain calibration or range of calibrations, and at the same time it is desirable that they be so disposed that a pleasingly balanced arrangement will be had over the front face of wall 12.

Such picturizations are primarily designed to graphically associate in the child's mind a cross-significant relation between a particular thermometer reading, whether a particular temperature or a particular range of temperatures, and a proper precaution to be taken by the child itself, for health or safety, upon the child preparing to go outdoors following the noting by the child itself of a certain thermometer reading.

The picturizations exemplifyingly shown in Figure 1 comprise a scene 14 showing an environment appropriate to temperatures ranging from 90° to 100° F. and a child appropriately clothed; a scene 15, showing an environment appropriate to temperatures ranging from 70° to 80° F. and a child appropriately clothed, a scene 16 showing an environment appropriate to temperatures ranging from 50° to 60° F. and a child appropriately clothed; a scene 17 appropriate to a temperature of 30° F. and including a pond or lake only thinly and hence dangerously ice coated; a scene 18 showing an environment appropriate to the temperature 0° F. and a child appropriately clothed; and a scene 19 showing an environment appropriate to the temperature —30° F. and a child appropriately clothed. Each of these scenes is significantly adjacent to the calibration or calibrations with which it is to be indelibly mentally associated in the subconscious mind of the child who has been instructed according to the method of the invention. As a preferred feature of the apparatus employed, the calibration or calibrations thus to be cross-significantly related to a scene depicted by the apparatus, are shown as being more accentuated than the other calibrations present—a full complement of such calibrations, as ordinarily employed on an actual thermometer, being displayed on the front face of wall 11, although, to simplify Figure 1, only the major readings already mentioned are there illustrated. As to said accentuated calibrations, it will be noted in Figure 1 that these are the calibrations or ranges of calibrations respectively associated with the different scenes, to wit, —30, 0, 30, 50, 60, 70, 80, 90 and 100.

In the form of the invention shown, the wall 11 is made from a thin metal sheet 21 stiffened at top and bottom and along both sides by a rearwardly directed flange 21a, and said wall is part of a collapsible easel assemblage which can be set up as illustrated to have the wall 11 stand vertical. This assemblage includes, in addition to the wall 11, a cradle-type base 22 formed and stiffened of thin sheet metal as indicated, pivotally connected to the wall 11 as at 23 and having a pair of swingable stays or struts 24 pivoted to the cradle at 25. These stays are provided at their free ends with hook openings for engaging studs 26 on wall 11 to erect the apparatus as shown, or for engaging studs 27 on the cradle when the apparatus is collapsed and out of use.

The tube 12 is preferably flattened away from an observer of Figure 1, as indicated in Fig. 2, to reduce the cross-sectional area of the bore of the tube, thereby to render the liquid column 13' always plainly visible from a distance, as from any point in a classroom, and yet to minimize the volumetric capacity of a supply chamber 28 for the liquid and in communication with the lower end of the tube.

The upper end of the tube is rearwardly bent, as indicated in Fig. 2 at 12a, and extends through an aperture in the wall 11 concealed behind a shaped metal hood 29 secured in place as by the rivets indicated. This length 12a of the tube is connected by a short piece of rubber hose 31 to a conduit 32, conveniently a goose-neck of glass, connected at its upper end to a chamber 33 held in place by a strap 34; which chamber is to act as an anti-overflow receptacle for the liquid 13 when the top level of the same is ever, as unintentionally, sent to the upper end of the tube. In order to provide an air vent, such upper tube end would be open; but by providing the overflow chamber 33, the venting is done through the top of this chamber, as by a small hole 33a.

Adverting now to the supply chamber 28, this is shown as in the form of a metallic bellows, and communication between the interior thereof and the lower end of tube 12, this end of the tube being rearwardly bent at 12b and sent through an opening in the wall 11, is accomplished by expedients similar to those just above described in explaining how the upper tube length 12a is connected to the overflow chamber 33. That is, said tube length 12b is connected by a short piece of rubber hose 34 to an angled conduit 35 leading directly to the bellows.

The opening in the wall 11, through which the lower rearwardly bent length 12b of the tube is extended, is concealed behind a hollow metal hemispherical hood 36 secured in place in any suitable way and desirably colored over that part of its surface 36a indicated in dotted lines in Figure 1; this color preferably matching the color of the liquid 13, as red, so that at all times, whatever be the height of the column of liquid in the tube 12, the same is apparently an upwardly extended continuation of a mass or pool of liquid in the hood 36, which latter then will simulate the ordinary bottom bulb of the ordinary thermometer.

Bellows 28 is suitably held in place behind the wall 11, as by a U-shaped strap bracket 37, suitably secured in place; which bracket also mounts, at the near end thereof in Fig. 2, a stationary nut indicated in Figure 1 at 38.

Referring now to the means for manually and at will raising and lowering the top 13' of the column of liquid in the tube 12, this means includes said nut, and also a lead screw indicated at 39 in Figure 1, said screw being rotatable at its inner end against a wear plate 41 fixed on the adjacent end wall of the bellows and carrying at its outer end a preferably knurled operating knob 42.

In operation, the assembly having been set up as shown in the drawing, and placed on a desk or table so as to have the front of the wall 11 face a classroom of very young children, these can be trained pursuant to the objects of the invention, and quickly and thoroughly, by well-recognized principles in pedagogy, including those of singsong recitation of the same lesson repeatedly, and otherwise, as by having such recitations change as the index means for a temperature reading is progressed uniformly up and down the line of calibration or is irregularly moved up and down the said line, and always accompanied by the conjoint display of an appropriately significantly related graphic representation. Thereby, the lessons being taught can be indelibly impressed on the mentality of each child for retention consciously and also subconsciously. Said indications are maintained or changed at the will of the instructor, merely by leaving the knob 42 unchanged in a certain adjustment or by moving same variously to expand or contract the bellows 28.

All that has been said herein, to give a full, clear and exact disclosure of the ways now preferred to practice the invention, is not to be taken in other than in an illustrative or exemplifying sense, and is not to be taken as at all intended to limit the invention except as the same is limited by the appended claims.

Variations and modifications may be made within the scope of this invention and portions of the improvements may be used without others.

I claim:

1. In an educational device; a wall structure having its front face calibrated to correspond to thermometer temperature readings; a substantially flat glass tube mounted on the wall; a supply of colored liquid connected with the bottom of the tube; means associated with the liquid supply to vary the height of the liquid in the tube at will; and means connected to the upper end of the tube to receive any overflow from the tube, said means having a vent therein.

2. In an educational device; a wall structure having its front face calibrated to correspond to thermometer temperature readings and having associated therewith pictures readily understandable by a small child to indicate physical reactions to such temperatures; a substantially flat glass tube mounted on the wall; a supply of colored liquid connected with the bottom of the tube; means associated with the liquid supply to vary the height of the liquid in the tube at will; and means connected to the upper end of the tube to receive any overflow from the tube, said means having a vent therein.

ROSE G. FOSTER.